United States Patent [19]

Yamamoto et al.

[11] Patent Number: 4,488,296
[45] Date of Patent: Dec. 11, 1984

[54] TIME DIVISION MULTIPLE ACCESS SYSTEM FOR TRANSMITTING AN ANALOG SIGNAL BY THE USE OF BURSTS WITHOUT SUBSTANTIAL INTERRUPTION

[75] Inventors: Kazuhiro Yamamoto; Masaaki Atobe, both of Tokyo, Japan

[73] Assignee: Nippon Electric Co., Ltd., Tokyo, Japan

[21] Appl. No.: 395,113

[22] Filed: Jul. 6, 1982

[30] Foreign Application Priority Data

Jul. 7, 1981 [JP] Japan .................................. 56-105108

[51] Int. Cl.$^3$ .............................................. H04J 3/12
[52] U.S. Cl. ................................... 370/104; 370/110.1
[58] Field of Search ...................... 370/104, 110.1, 111, 370/110.4, 11, 110.2

[56] References Cited

U.S. PATENT DOCUMENTS

| | | | |
|---|---|---|---|
| 3,870,828 | 3/1975 | Saliga | 370/110.4 |
| 4,079,203 | 3/1978 | Dragoo | 370/110.4 |
| 4,168,398 | 9/1979 | Matsuo et al. | 370/104 |
| 4,252,999 | 2/1981 | Acampora et al. | 370/104 |
| 4,287,588 | 9/1981 | Segner | 370/104 |
| 4,363,127 | 12/1982 | Evans et al. | 370/110.4 |
| 4,387,460 | 7/1983 | Boutmy et al. | 370/110.4 |

Primary Examiner—Douglas W. Olms
Assistant Examiner—Kenneth I. Rokoff
Attorney, Agent, or Firm—Laff, Whitesel, Conte & Saret

[57] ABSTRACT

In a time division multiple access system comprising a central station and a plurality of substations, a subsidiary analog signal is sampled at a sampling circuit of each substation M times during each frame period to produce a succession of sampled pulses. A group of M sampled pulses is located by a substation delay circuit in each up-link burst assigned to each substation. Responsive to an up-link succession including each up-link burst, the central station reproduces the sampled pulse group from each up-link burst into a reproduced group of M reproduced pulses by central station sampling pulses synchronized with the M sampled pulses. The M reproduced pulses are rearranged by a central station delay circuit into sampled pulse reproductions appearing M times in each frame period. The sampled pulse reproductions are desampled into the subsidiary signal. The number of M may be equal to or greater than one.

5 Claims, 4 Drawing Figures

TIME DIVISION MULTIPLE ACCESS SYSTEM FOR TRANSMITTING AN ANALOG SIGNAL BY THE USE OF BURSTS WITHOUT SUBSTANTIAL INTERRUPTION

BACKGROUND OF THE INVENTION

This invention relates to a time division multiple access system for use in a radio communication network and, in particular, in a multidirectional time-division multiplex radio communication network.

Such a time division multiple access system comprises a central station fixedly located at a predetermined terrestrial site and a plurality of substations geographically spaced on the earth from the central station, as will later be described with reference to one of some figures of the accompanying drawing.

In order to carry out communication between the central and each substation, a succession of down-link continuous signals is sent from the central station to be reproduced at each substation by selecting the down-link continuous signals allotted thereto while an up-link burst sequence is sent from each substation to the central station with the up-link bursts produced in a predetermined order under control of the central station to form at the central station a frame including a predetermined number of the up-link bursts.

Each up-link burst has been used for transmitting a main signal, such as a data signal, a speech signal, or the like, from each substation to the central station. In addition to the main signal, a subsidiary signal of an analog form, such as an order-wire signal, a supervisory signal, or the like, has been carried by each up-link burst.

With such a conventional system, a particular or common time slot has been assigned to each up-link frame and has been commonly used by the respective substations to transmit the subsidiary signals therefrom. The subsidiary signals are arranged during the common time slot in a digital form. An addition of the common time slot to the up-link frame gives rise to an inevitable increase of a clock repetition frequency used in this system and widens a radio frequency band. This means that unfavorable interference is induced into another system using an adjacent frequency band. In addition, the operation for controlling the subsidiary signals becomes intricate.

An application of an FM composite transmission method to the time division multiple access system may be contemplated to transmit the subsidiary signal in addition to the main signal. With such a transmission method, the subsidiary signal is subjected to frequency modulation under a low modification index with the main signal phase modulated.

Inasmuch as an up-link burst of each substation intermittently appears in each frame, the frequency modulated subsidiary signal is inevitably interrupted. Accordingly if, the frequency modulated subsidiary signal is to be continuously produced, it becomes discontinuous. Thus, the subsidiary signal can not favorably be transmitted with this method.

SUMMARY OF THE INVENTION

It is an object of this invention to provide a time division multiple access system, wherein a subsidiary signal of an analog form can be transmitted from each substation to a central station by the use of a burst without any interruption of the subsidiary signal.

It is another object of this invention to provide a time division multiple access system of the type described, which needs no extra interval of time or time slot for transmitting the subsidiary signal and, as a result, can transmit the subsidiary signal without an increase of a time slot.

A time division multiple access system to which this invention is applicable comprises a central station and N substations where N represents a natural number greater than one. The central station is for transmitting a down-link succession of down-link continuous signals with N successive ones of the down-link continuous signals transmitted in each of a plurality successive frame periods of a common duration to the respective substations. The substations are for accessing the central station by N main and subsidiary signal combinations, respectively. The main and subsidiary signal combinations are to be received at the central station in a succession of intervals of time. The intervals are divisible into N interval sequences which are assigned to the respective substations with N successive ones of the intervals arranged in each of the frame periods and with the intervals of one of the interval sequences next followed by the respective intervals of another of said interval sequences.

According to this invention, each of the substations comprises timing pulse producing means responsive to the down-link succession for producing a sequence of timing pulses defining the respective intervals of a particular one of the interval sequences that is assigned to the each substation. A sampling pulse producing means is responsive to the timing pulse sequence for producing a succession of sampling pulses with at least one sampling pulse produced in each of the frame periods. A sampling means is responsive to the sampling pulse succession for sampling a particular one of the subsidiary signals of the combination that is to be transmitted from the each substation. The sampling means produces a succession of sampled pulses with at least one sampled pulses produced in each of the frame periods. The sampled pulse sequence is representative of the particular subsidiary signal.

The substation further comprises signal pulse locating means which is responsive to the sampled pulse succession for locating at least one signal pulse in each interval of the particular interval sequence by deriving at least one sampled pulse from the sampled pulse succession to produce a sequence of signal pulses arranged in the particular interval sequence. Transmitting means is responsive to a particular one of the main signals of the combinations that is to be transmitted from each substation and to the signal pulse sequence for transmitting a sequence of up-link bursts to the central station in the respective intervals of the particular interval sequence. The up-link burst sequence is representative of the particular main signal and the signal pulse sequence.

DESCRIPTION OF THE PREFERRED EMBODIMENTS

Figure 1:
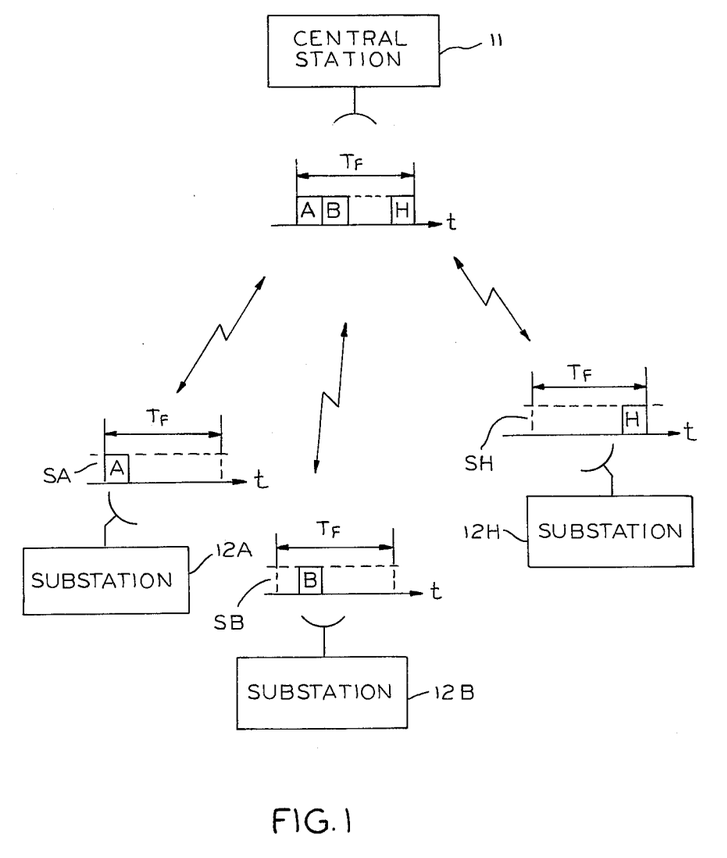
FIG. 1 shows a diagrammatic view of a time division multiple access system to which this invention is applicable.

Referring to FIG. 1, a time division multiple access system to which this invention is applicable will be described at first for a better understanding of this invention. The system constitutes a multidirectional time-division multiplex radio communication network and comprises a central station 11 fixed at a predetermined terrestrial site and N substations 12A, 12B . . . , and 12H which are geographically spaced from the central station 11, where N represents a natural number greater than one.

Such a communication network is suitable for communication between the central station 11 and a comparatively small number of the substations 12A, 12B, . . . , and 12H. Herein, the number of the substations is equal to any one of 6, 8, or the like and a frequency band, for example, between 1.8 and 2.3 GHz is used in this communication network.

The central station 11 sends a down-link succession of down-link continuous signals in a time division fashion in a multidirection for the respective substations 12A, 12B, . . . , and 12H. Each of frames is formed by N successive ones of the down-link continuous signals and repeated at a predetermined frame period $T_F$ of a duration common to the respective substations 12A-12H. Each of the down-link continuous signals is assigned to each time slot A, B, . . . , and H predetermined for the substations and may have a different interval of time from one another.

The substations 12A-12H are put into operation in synchronism with clock pulses derived from the down-link succession to selectively receive the down-link continuous signals allotted to the respective substations 12A-12H at every frame period $T_F$. Responsive to the clock pulses, the respective substations transmit up-link bursts in time slots A-H allotted thereto. Each of the up-link bursts carries a main signal, such as a speech signal, a data signal, or the like. Moreover, a subsidiary signal, such as an order-wire signal, a supervisory signal, or the like is also carried by each up-link burst. In the illustrated system, it may be said that the main signal is sent from each substation after subjected to four-phase phase modulation while the subsidiary signal is transmitted after subjected to frequency modulation. At any rate, the central station 11 is supplied with N main and subsidiary signal combinations from the respective substations 12 (suffixes omitted) and accessed in response to the respective combinations.

The up-link bursts are received at the central station 11 in the form of an up-link succession as shown in FIG. 1. As is the case with the down-link succession, the up-link succession includes a plurality of up-link frames each of which is repeated at an up-link frame period equal to the down-link frame period. Therefore, each of the up-link and the down-link frame periods will be simply called a frame period hereinafter.

In other words, the up-link succession is arranged in successive intervals of time which may be called subframes or time slots. The interval succession or time slot succession is divisible into N interval sequences SA, SB, . . . , and SH which are assigned to the respective substations, as illustrated in FIG. 1. In the illustrated system, each of the frame periods includes N successive ones of the intervals or time slots. The intervals of one of the internal interval sequences, for example, those of the time slot interval sequences SA are next followed by the respective internal intervals of another of time slot interval sequences SB.

Figure 2:
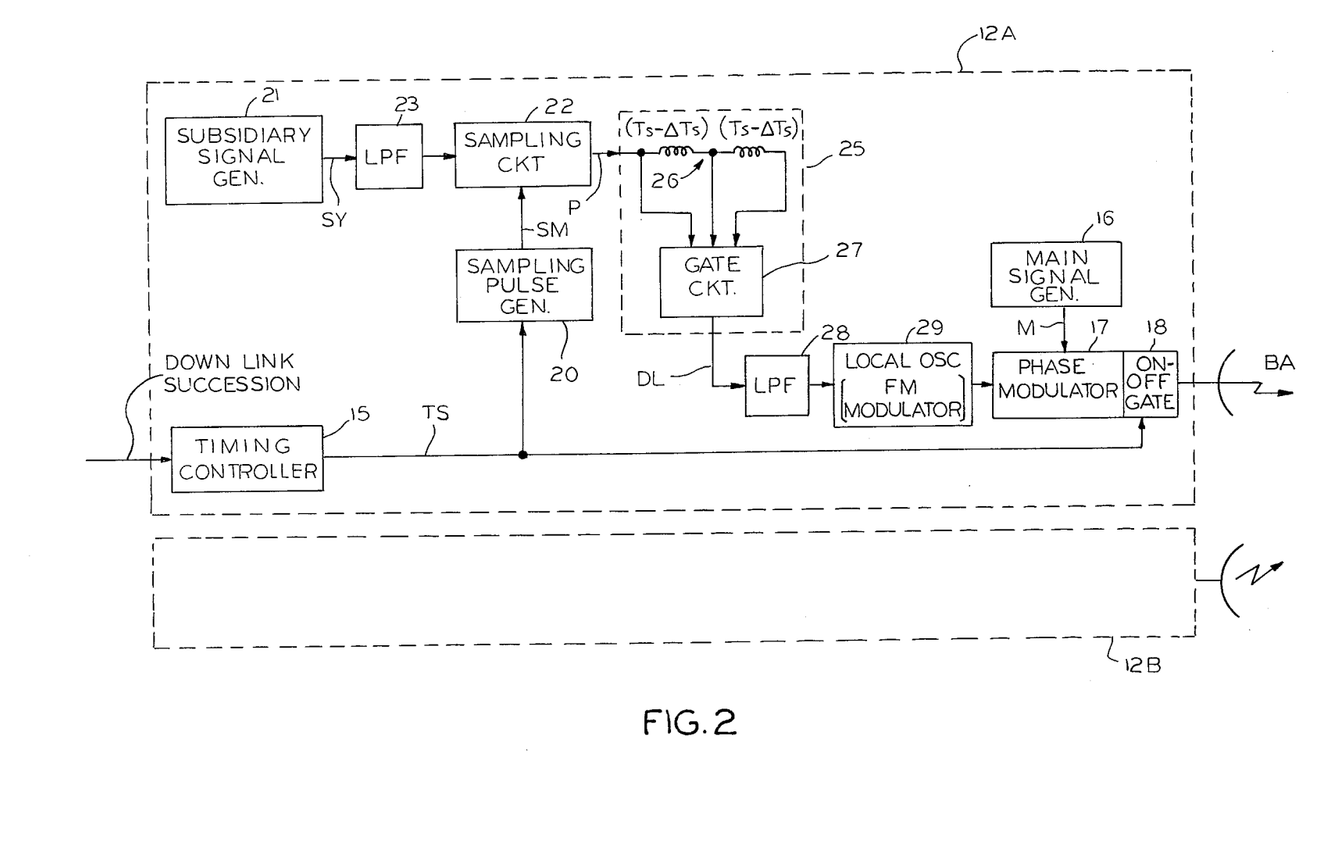
FIG. 2 shows a block diagram of a substation for use in a time division multiple access system according to a first embodiment of this invention.
Figure 3:
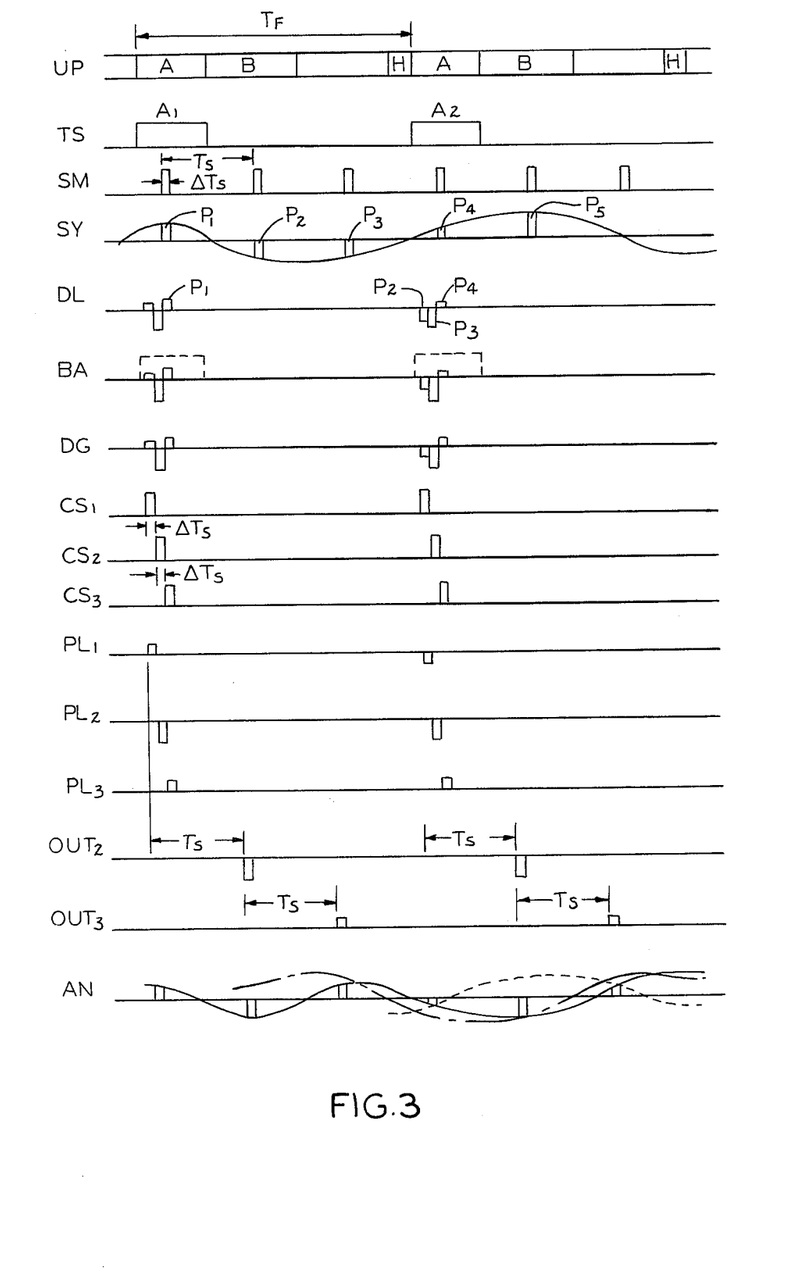
FIG. 3 shows a time chart for describing operation of the time division multiple access system according to the first embodiment of this invention.

Referring to FIGS. 2 and 3, a substation indicated by 12A in FIG. 2 is for use in a time division multiple access system according to an embodiment of this invention and comprises a timing controller 15 responsive to the down-link succession for extracting the internal interval sequence of time slot SA assigned to the substation 12A, as depicted at SA in FIG. 1. The internal interval sequence of time slot SA is specified by a timing pulse sequence TS including timing pulses $A_1$ and $A_2$ produced by the timing controller 15. Preferably, each timing pulse $A_1$-$A_2$ lasts during each interval assigned to the substation 12A.

The interval sequence of time slot SA is received at the central station 11 as the up-link succession UP formed by combination with the remaining N−1, interval sequences labelled B-H, as shown atop of FIG. 3. Thus, each interval sequence, such as SA, is in timed relation to the up-link succession UP.

In FIG. 2, the substation 12A comprises a main signal generator 16 for generating a main signal M, such as a data signal, having an inphase component and a quadrature component. Such a main signal M is supplied to a phase modulator 17 to be subjected to four-phase phase modulation. Responsive to the timing pulse sequences $A_1$-$A_2$, an on-off gate 18 produces a phase modulated main signal as the up-link burst BA during presence of each timing pulse $A_1$-$A_2$.

Further referring to FIG. 2, the timing pulse sequence TS is supplied to a sampling pulse generator 20 to produce a succession of sampling pulses SM at a predetermined sample period $T_S$. Each of the sampling pulses SM has a sampling pulse width designated by $\Delta T_S$. A first one of the sampling pulses SM shown at the leftmost end thereof is delayed somewhat from the leading edge of the timing pulse $A_1$. This delay will be described later.

The substation 12A further comprises a subsidiary signal generator 21 for producing a subsidiary signal SY. As shown in FIG. 3, the subsidiary signal SY is given in the form of an analog signal. Let the analog signal mainly fall within an audio frequency band.

Such a subsidiary signal SY is supplied to a sampling circuit 22 after restricted to a frequency band between 0 and 3 kHz by a low pass filter 23. The low pass filter 23 serves to protect any error signal from occurring on sampling the subsidiary signal SY.

As readily understood from the above, a repetition frequency and the sampling period $T_S$ of the sampling pulse sequence is higher and shorter than 6 kHz and 167 microseconds, respectively, to sample the subsidiary signal SY between 0 and 3 kHz.

Herein, let the frame period $T_F$ be equal to 450 microseconds. Under these circumstances, the subsidiary signal SY may be sampled at the sampling period $T_S$ of 150 microseconds. In other words, three of the sampling pulses appear within every frame period $T_F$, as illustrated in FIG. 3.

For convenience of the later description, the number of the sampling pulses produced in each frame period is assumed to be represented by a natural number M. In the illustrated system, the natural number is equal to three.

Anyway, the sampling circuit 22 produces a succession of sampled pulses representative of the subsidiary signal SY which is to be transmitted from the substation 12A. Each of the sampled pulses is indicated at P in the subsidiary signal SY and successively numbered from the leftmost one as $P_1, P_2, \ldots$.

The sampled pulses P are successively sent to a delay circuit 25 for delaying the sampled pulse succession P until appearance of the next following timing pulse $A_2$ to produce a delayed pulse succession DL including delayed sampled pulses equal in number to the natural number M during presence of the next following timing pulse $A_2$.

More particularly, the delay circuit 25 comprises a delay portion 26 comprising a plurality of unit delay circuits which are connected in cascade and each of which has a unit delay time represented by $T_S - \Delta T_S$. Thus, the unit delay time is shorter than the sampling period $T_S$ by the sampling pulse width $\Delta T_S$. In the illustrated delay portion 26, the number of the unit delay circuits is equal to $M-1$, namely, two.

In this delay portion 26, a first one of the sampled pulses (depicted at $P_1$) does not appear during presence of the next following timing pulse $A_2$ even when the first sampled pulse $P_1$ is delayed by the delay portion 26. Instead, the first sampled pulse $P_1$ is produced during presence of the current timing pulse $A_1$ without a delay together with two sampled pulses (not shown) sampled in the preceding frame period.

Second and third ones of the sampled pulses $P_2$ and $P_3$ appear as second and third ones of the delayed pulses DL during presence of the next following timing pulse $A_2$. With the abovementioned delay portion 26, the second delayed pulse $P_2$ is at first produced from the delay portion 26 and is followed by the third delayed pulse $P_3$ during the presence of the timing pulse $A_2$. After production of the third delayed pulses $P_3$, a fourth one of the sampled pulses $P_4$ appears without a delay. Thus, three of the sampled signals are collected or gathered by a gate circuit 27 connected to the respective unit delay circuits within a single timing pulse, such as $A_2$.

From this fact, is is readily understood that the preceding sampled pulse, such as $P_2$, is delayed longer than the following sampling pulse $P_3$ by the delay portion 26 and is produced from the delay portion 26 earlier than the latter. This is because each of the delay unit circuits has the unit delay time shorter than the sampling period and is connected in cascade relative to each other. In any event, the illustrated delay circuit 25 serves to give each of the sampled pulses successively increasing delays and to derive or gather a group of M delayed pulses from the delayed pulse succession in each of the intervals assigned to the substation 12A.

It should be recollected that the sampling pulse corresponding to the first sampled pulse $P_1$ is delayed relative to the leading edge of the timing pulse $A_1$. The delay between the leading edge and the sampling pulse in question gives a time for arranging two of the delayed pulses each having the pulse width of $\Delta T_S$.

The pulse width $\Delta T_S$ should be determined in consideration of the intervals, namely, time slots which are assigned to the respective substations and which may be variable in length of time. If the shortest one of the intervals is present, the sampling pulse width $\Delta T_S$ should be less than one third of the shortest interval in the illustrated substation 12A on condition that each substation samples each of the subsidiary signals at the same sampling period by the use of sampling pulses having the same sampling pulse widths.

The delayed pulses DL, namely, gathered sampled pulses are sent from the gate circuit 27 through an additional low pass filter 28 to a local oscillator 29, with those harmonic components removed from the delayed pulses DL by the additional low pass filter 28. The local oscillator 29 generates a local oscillation signal of a preselected frequency. The local oscillation signal is frequency modulated by the delayed pulses DL supplied through the additional low pass filter 28. Such frequency modulation is possible by the use of a well-known element, such as a diode, included in the local oscillator 29. It should be noted here that a modulation index is very low in the frequency modulation. For example, a frequency deviation may be about 7 kHz rms in the frequency modulation. In other words, shallow frequency modulation is carried out by the element. Such shallow frequency modulation prevent the main signal M from being adversely affected by transmission of the subsidiary signal SY.

As a result, a frequency modulated local oscillation signal is supplied to the phase modulator 17 to be subjected to four-phase phase modulation in a manner described before. A combination of the local oscillator 29, the phase modulator 17, and the on-off gate 28 is operable in response to the main signal M and the delayed pulse sequence to transmit the up-link burst BA to the central station in the intervals which are assigned to the substation 12A and specified by the timing pulse sequence TS. Therefore, the main and subsidiary signal combination appears as the combination of the main signal M and the delayed pulse sequence DL in the illustrated substation 12A. Thus, the up-link burst BA carries the main signal M and the delayed pulse sequence DL. The up-link bursts BA are intermittently produced as a sequence during the intervals appearing at every frame period.

The other substations (represented by the substation 12B in FIG. 2) are similar in structure and operation to the substation 12A. The resultant up-link sequences are sent from the remaining substations to the central station 11 in the interval sequences assigned to the remaining substations. The up-link succession UP is thus formed by arranging the respective up-link burst sequences, as shown atop of FIG. 3.

Figure 4:
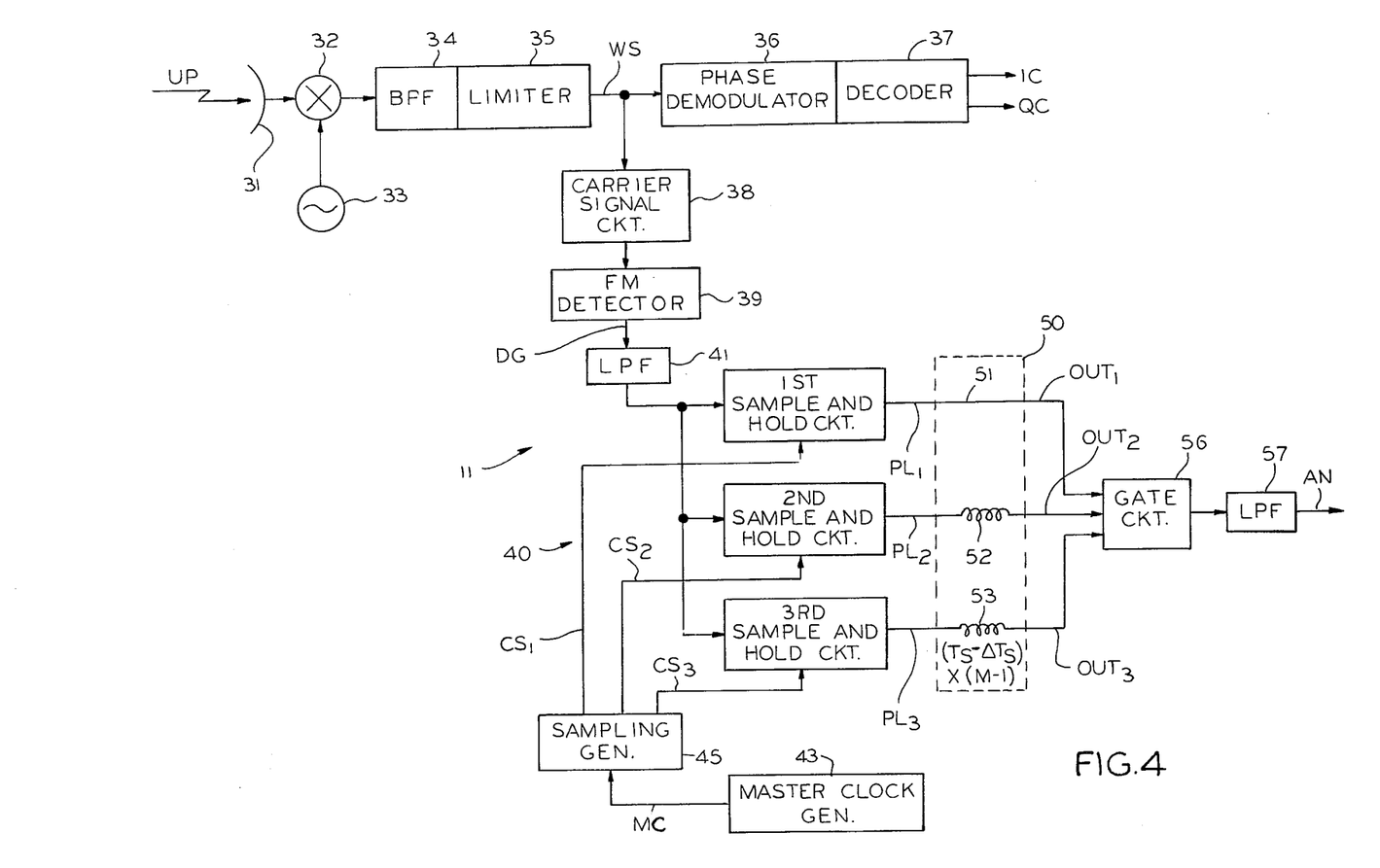
FIG. 4 shows a block diagram of a central station for use in combination with the substation illustrated in FIG. 2.

Referring to FIG. 4 afresh and FIG. 3 again, the central station 11 for use in combination with the substations as shown in FIG. 2 receives the up-link succession UP of the up-link bursts illustrated with reference to FIG. 3. In each of the frame period, N successive up-link bursts are received at the central station 11. The central station 11 separates the up-link bursts of the succession UP into N up-link burst sequences transmitted from the respective substations. Each up-link burst sequence includes the up-link bursts appearing at every frame period. For brevity of description, operation of the central station 11 will mainly be described about processing the up-link burst transmitted from the substation 12A but the similar operation is carried out in the other substations in order to process the up-link burst sequences transmitted from the other substations.

In FIG. 4, the up-link succession UP is supplied through an antenna 31 to a mixer 32 coupled to a central station local oscillator 33 to be converted into a reception intermediate frequency signal (abbreviated to an IF signal). The IF signal is sent from the mixer 32 through a band pass filter 34 to a limiter 35 to be wave-shaped.

A wave shaped signal WS is delivered from the limiter 35 to a phase demodulator 36 in which the wave shaped signal WS is subjected to four-phase phase demodulation. In consequence of the phase demodulation, a main signal component is supplied as a reproduction of the main signal from the phase demodulator 36 to a decoder 37. The decoder 37 decodes the reproduction into a pair of decoded signals IC and QC corresponding to the inphase and the quadrature components of the main signal M.

Further referring to FIG. 4, the wave-shaped signal WS is also delivered from the limiter 35 to a carrier signal circuit 38. The carrier signal circuit 38 serves to derive a carrier signal component of an intermediate frequency band from the wave-shaped signal WS and to eliminate the main signal component. The carrier signal component is subjected to frequency modulation by the delayed pulse sequences.

Responsive to the carrier signal component, a frequency-modulation detector (abbreviated to an FM detector) 39 detects the delayed pulse sequence to produce discrete groups (indicated by DG in FIG. 3) of delayed pulse reproductions representative of the respective delayed pulses produced in the substations 12B. Each discrete group DG is compressed or gathered in each of the intervals assigned to the up-link bursts for the substation 12A.

The delayed pulse reproductions indicated by DG are sent from the FM detector 39 to a rearranging circuit 40 as will presently be described after passing through a low pass filter 41 having a pass band of about $1/\Delta T_S$. The low pass filter 41 lends itself to improvement of a signal to noise ratio of the delayed pulse reproductions DG.

The rearranging circuit 40 is coupled to a master clock generator 43 for producing a succession of master clocks MC. The master clocks MC specify the intervals assigned to the respective up-link bursts. Therefore, the master clock generator 43 is operable to extract a specific one of the up-link burst sequences that is transmitted from the substation 12A. The rearranging circuit 40 comprises a sampling pulse generator 45 responsive to the master clock succession MC for producing three streams $CS_1$, $CS_2$, and $CS_3$ of sampling pulses with reference to each of the master clocks MC. In other words, the number of the sampling pulse streams is equal to the natural number M described in conjunction with FIG. 2. The sampling pulse streams $CS_1$, $CS_2$, and $CS_3$ are referred to as first, second, and third pulse streams, respectively. The second pulse stream $CS_2$ is delayed relative to the first pulse stream $CS_1$ by the delay time equal to the sampling pulse width $\Delta T_S$ described in connection with FIG. 2 and is followed by the third pulse stream $CS_3$ appearing the same delay time after the second pulse stream $CS_2$.

The first through third pulse streams $CS_1$ to $CS_3$ are produced by the sampling pulse generator 45 in response to each of the master clocks MC. As a result, three pulses appear during every one of the up-link bursts, as exemplified with respect to the up-link bursts BA assigned to the substation 12A. This implies that, during the next following up-link burst, three pulses which belong to the respective pulse streams $CS_1$ to $CS_3$ are produced by the sampling pulse generator 45.

The first pulse stream $CS_1$ is delivered to a first sample-and-hold circuit 46 in synchronism with a first one of the discrete groups DG. Likewise, the second and the third pulse streams $CS_2$ and $CS_3$ are delivered to second and third sample-and-hold circuits 47 and 48 in timed relation to second and third ones of the discrete groups DG, respectively. As a result, the discrete groups DG of the delayed pulse reproductions are separated into first, second, and third reproduced pulse sequences $PL_1$, $PL_2$, and $PL_3$ by the first through third sample-and-hold circuits 46 to 48, respectively, as shown in FIG. 3.

The rearranging circuit 40 further comprises a central station delay circuit 50 responsive to the first through third reproduced pulse sequences $PL_1$, $PL_2$, and $PL_3$ for giving successively increasing delays thereto to produce a succession of sampled pulse reproductions representative of the sampled pulses sampled in the substation 12A. Such a sampled pulse reproduction succession represents the subsidiary signal transmitted from the substation 12A.

More particularly, the delay circuit 50 comprises a first delay element 51 having no substantial delay and second and third delay elements 52 and 53 having delays equal to $T_S - \Delta T_S$ and $2(T_S - \Delta T_S)$, respectively. Inasmuch as the first reproduced pulse sequence $PL_1$ is given to the first delay element 51, each pulse of the sequence $PL_1$ appears as a first output signal $OUT_1$ without any substantial delay.

Herein, it is to be noted here that each pulse of the second reproduced pulse sequence $PL_2$ is delayed relative to that of the first reproduced pulse sequence $PL_1$ by $\Delta T_S$ while each pulse of the third reproduced pulse sequence $PL_3$, by $2 \cdot \Delta T_S$.

When each pulse of the second reproduced pulse sequence $PL_2$ is subjected to the delay of $T_S - \Delta T_S$ by the second delay element 52, it appears as second output signal $OUT_2$ at a time point one sampling period $T_S$ after appearance of the first reproduced pulse $PL_1$.

Likewise, the third delay element 53 produces a third output signal sequence $OUT_3$ at another time point two sampling period $2T_S$ after production of the first output signal sequence $OUT_1$ because of the delay of $2(T_S - \Delta T_S)$ in the third delay element 53.

The first through third output signals $OUT_1$ to $OUT_3$ are supplied to a gate circuit 56 as the succession of the sampled pulse reproductions. Thus, the discrete groups DG compressed in each up-link burst BA is rearranged into the sampled pulse reproductions produced at every sampling period $T_S$.

Responsive to the succession of the sampled pulse reproduction, a low pass filter 57 desamples or converts the succession into an analog signal AN representative of a reproduction of the subsidiary signal transmitted from the substation 12A, as indicated by a real line.

The above-mentioned rearrangement results in concurrent reproductions of the subsidiary signals transmitted from the other substations, as depicted at a broken line and a dot-and-dash line in AN. Such concurrent reproductions are effective for transmission of the order-wire signals from the substations.

In the time division multiple access system according to the first embodiment of this invention, it has been assumed that the sampling period $T_S$ is equal to one third of the frame period $T_F$ and the natural number M is equal to three. However, the sampling period $T_S$ may not be shorter than the frame period $T_F$. In order to precisely sample the subsidiary signal, it is also assumed that the natural number M is equal to unity even when the subsidiary signal is satisfactorily sampled by a sampling pulse having a sampling period $T_S$ longer than the frame period $T_F$. In this case, the sampling period $T_S$ becomes equal to the frame period $T_F$. Accordingly, a single one of the sampling pulses SM may appear within each sampling period $T_F$. If the single sampling pulse is produced within each timing pulse, the delay circuit 25 is unnecessary in each substation because the sampled pulse may be sent for the central station 11 without any delay, as are the cases with the first and the fourth sampled pulses $P_1$ and $P_4$. This means that the central station 11 needs no delay circuit 50 also. On the other hand, if the single sampling pulse is shifted or displaced from a current up-link burst, as illustrated at the second or the third sampled pulse $P_2$ or $P_3$, each sampled pulse should be delayed until appearance of the next following up-link burst corresponding to the current up-link burst. Consequently, each substation is provided with a delay circuit, such as 25. However, the central station does not always need any delay circuit, such as 50.

Taking the above into consideration, it will be seen that the delay circuit 25 in each substation is operable to locate or arrange at least one sampled pulse in each up-link burst. In this sense, the delay circuit 25 and/or the gate circuit 27 may be called a locating circuit for locating at least one sampled pulse in a preselected interval of the interval sequence assigned to each substation.

While this invention has thus far been described in conjunction with a few embodiments thereof, it is readily possible for those skilled in the art to put this invention into practice in various manners. For example, the leading sampled pulse, such as $P_1$ or $P_4$, in each frame may also be delayed until the next following timing pulse $A_2$ by connecting a similar unit delay circuit. This structure is especially effective when the leading sampled pulse is not produced during presence of each timing pulse $A_1$ or $A_2$.

What is claimed is:

1. A time division multiple access system comprising a central station and N substations where N represents a natural number greater than one, said central station including means for transmitting a down-link succession of down-link continuous signals with N successive down-link signals being transmitted in each of a plurality of successive time frame periods of a common duration, the down-link transmission being to the respective substations, means at each of said substations for accessing said central station by N main and subsidiary signal combinations, respectively, said main and subsidiary signal combinations being received at said central station in a succession of time slot intervals, said time slot intervals being divisible into N internal interval sequences which are assigned to the respective substations with N successive ones of said time slot intervals arranged in each of said frame periods and with the intervals of one of said internal interval sequences followed by the respective intervals of another of said internal interval sequences, wherein each of said substations further comprises:

timing pulse producing means responsive to said down-link succession for producing a sequence of timing pulses for defining the respective time positions of a particular one of said internal interval sequences that is assigned to each of said substations;

sampling pulse producing means responsive to said timing pulse sequence for producing a succession of sampling pulses with at least one sampling pulse produced within each of said time frame periods;

sampling means responsive to said sampling pulse succession for sampling a particular one of the subsidiary signals of said combinations that is to be transmitted from each of said substations, said sampling means producing a succession of sampled pulses with at least one sampled pulse produced in each of said frame periods, said sampled pulse sequence being representative of said particular subsidiary signal;

signal pulse time locating means responsive to said sampled pulse succession for locating at least one signal pulse in each time slot interval of said particular internal interval sequence by deriving the at least one sampled pulse from said sampled pulse succession to produce a sequence of signal pulses arranged in said particular internal interval sequence; and transmitting means responsive to a particular one of the main signals of said combinations that is to be transmitted from each of said substations and to said signal pulse sequence for transmitting a sequence of up-link bursts from said substation to said central station in the respective intervals of said particular internal interval sequence, said up-link burst sequence being representative of said particular main signal and said signal pulse sequence.

2. A time division multiple access system as claimed in claim 1, said central station being capable of receiving a succession of up-link bursts with N successive up-link bursts of said up-link transmission being received in each of said frame periods, the up-link bursts of said up-link succession consisting of N up-link burst sequences transmitted from the respective substations, wherein said central station comprises:

deriving means for successively deriving a specific one of said N up-link burst sequences, said specific up-link burst sequence carrying the signal pulse sequence produced in a specific one of said substation, the signal pulse sequence including a single pulse of a sequence arranged within each of the up-link bursts of said specific up-link burst sequence;

reproducing means responsive to said specific up-link burst sequence for reproducing a sequence of said single pulses; and means for converting said sequence of single pulses into said specific subsidiary signal.

3. A time division multiple access system as claimed in claim 1, wherein:

said sampling pulse producing means produces M sampling pulses of said sampling pulse succession in each of said frame periods, where M represents a predetermined integer which is greater than one;

said sampling means producing M sampled pulses of said sampled pulse succession in each of said frame periods;

said signal pulse locating means comprising:

delay means for delaying at least those (M−1) sampled pulses of said sampled pulse succession to produce at least (M−1) delayed pulses of a delayed pulse succession, said (M−1) sampled pulses being produced together with a particular sampled pulse in each of said frame periods, said (M−1) delayed pulses being produced together with said particular sampled pulse in each of the intervals of said particular internal interval sequence; and means for producing the (M−1) delayed pulses and the particular sampled pulse as M signal pulses produced in each of the intervals of said particular internal sequence.

4. A time division multiple access system as claimed in claim 3, said central station being capable of receiving a succession of up-link bursts with N successive ones of the up-link bursts of said succession received in each of said frame periods, the up-link bursts of said up-link transmission including N up-link burst sequences transmitted from the respective substations, wherein said central station comprises:

extracting means for extracting a specific up-link burst sequence transmitted in a specific one of said internal interval sequences that is assigned to a certain one of said substations wherein M sampling pulses of a sampling pulse sequence are produced in each of said frame periods, said specific up-link burst sequence being representative of the signal pulses produced in said certain substation as a specific signal pulse sequence;

reproducing means responsive to said specific up-link burst sequence for reproducing said specific signal pulse sequence, said reproducing means producing discrete groups of signal pulse reproductions representative of the respective signal pulses produced in said one substation, each of said discrete groups comprising M signal pulse reproductions in each of the intervals of said specific internal interval sequence;

rearranging means for rearranging the M signal pulse reproductions of each of said discrete groups into M sampled pulse reproductions distributed in each of said frame periods, said rearranging means producing a succession of sampled pulse reproductions representative of a specific one of said subsidiary signals that is transmitted from said one substation; and means responsive to said sampled pulse reproductions for converting said sampled pulse reproductions into said specific subsidiary signal.

5. A time division multiple access system as claimed in claim 4, wherein said rearranging means comprises:

sampling pulse generating means for generating at least two streams of sampling pulses, the respective streams being generated in substantial synchronism with the delayed pulse reproductions in each discrete group; and central station delay means responsive to said sampling pulse streams for giving a plurality of successively increasing delays to the delayed pulse reproductions of each of said discrete groups to produce said succession of sampled pulse reproductions.

* * * * *